Patented Jan. 4, 1927.

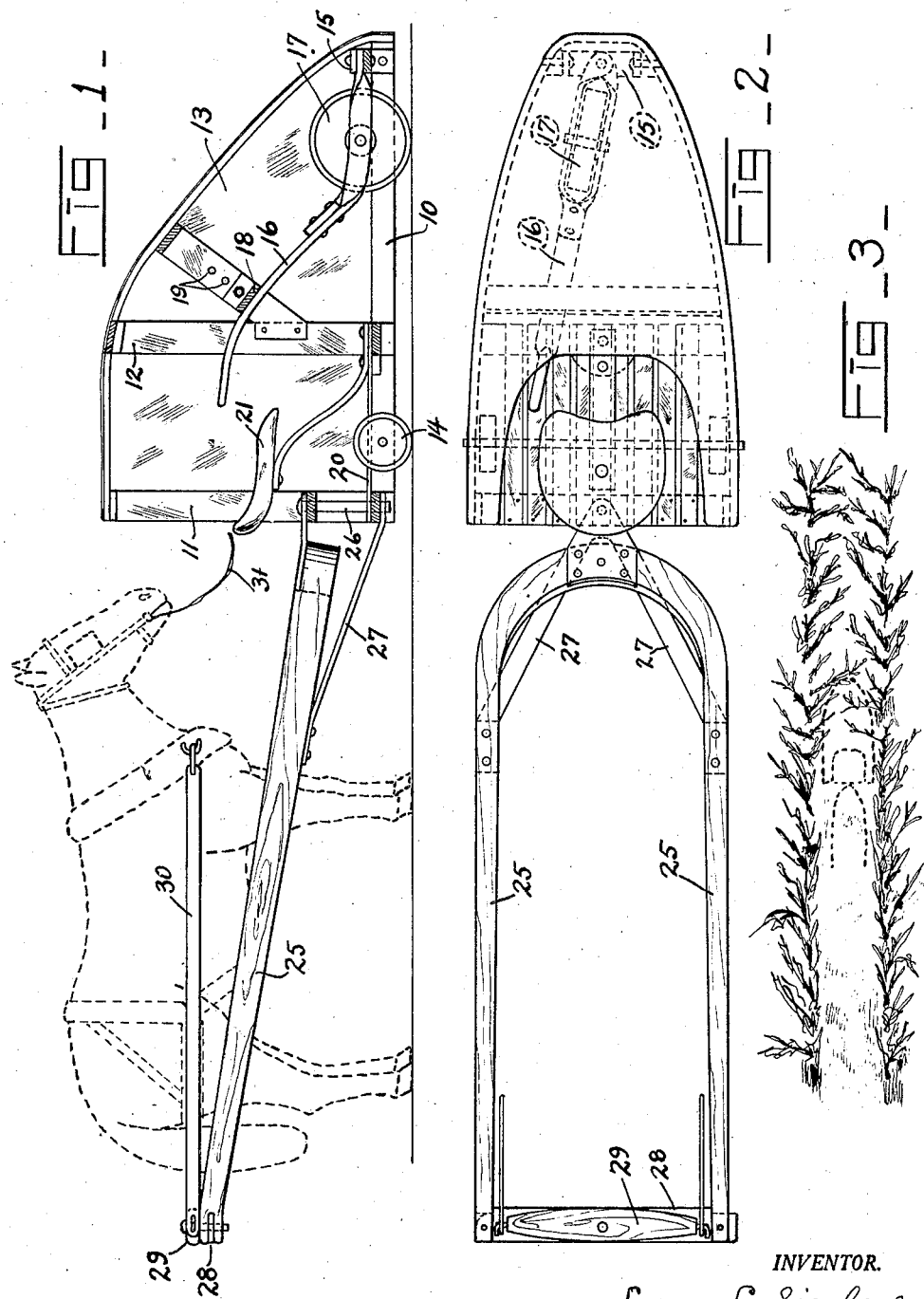

1,613,486

UNITED STATES PATENT OFFICE.

LOREN L. SIZELOVE, OF OXFORD, OHIO.

CORN TURNER.

Application filed May 3, 1923. Serial No. 636,313.

My invention relates to apparatus for turning growing corn out of the space between rows of growing corn, after the stalks have been bent down by storms or other causes, to permit the passage of a grain drill.

Corn is planted in rows approximately three feet apart, and in some localities it is customary for farmers to plant wheat in the spaces between the rows of corn. The appropriate time for planting the wheat arrives before the time for cutting the corn, although not before the corn has grown to nearly, if not quite, its full height. It frequently happens that the corn plants or stalks are bent down by storms, so that they lie on the ground, and as the stalks usually extend more or less across the spaces between the rows they interfere with the passage down the spaces of the machine or drill by which the wheat is planted.

My invention comprises a shuttle-shaped implement adapted to move along the space between two rows of corn and push the reclining stalks to their own sides of the space. This implement, which resembles a sewing machine shuttle, is mounted on wheels and as it rolls along the ground its nose runs under the stalks, partially lifting the stalks and by virtue of its shuttle-like form the implement lays the stalks aside, leaving the space between the rows clear. The implement is built with a smooth exterior, so that it effects its purpose without injuring the stalks or the ears on the stalks. When I speak of this implement operating on "growing corn", I refer to the fact that the corn has not been cut. In other words, the implement is designed to operate on corn which is still rooted in the ground, and irrespective of the state of development which it may have attained.

I shall now describe my implement and give a more detailed description of its operation, referring to the accompanying drawings, in which—

Fig. 1 is an elevational view, in section, of one embodiment of my invention;

Fig. 2 is a plan view thereof;

Fig. 3 is a diagrammatic view, showing two rows of corn, with my implement moving along the intervening space, showing the effect it is designed to produce.

Referring more particularly to Figs. 1 and 2, the implement comprises a frame consisting of a skirt bar 10, and arch members 11 and 12. The frame is covered by a shell 13, preferably of sheet metal, so formed as to give to the structure as a whole the shuttle-like shape previously referred to. At the rear this implement is supported by a pair of wheels 14, so placed that the skirt of the shell moves rather close to the ground. At the front end, or nose, a bar 15 is pivotally attached to the skirt bar 10, and to this bar a lever 16 is pivotally connected. A wheel 17 is mounted to rotate on this lever, and it is evident, upon examination of Figs. 1 and 2, that by swinging the lever to the right or left the direction of movement of the implement may be controlled, while the altitude of the nose of the implement may be increased or diminished by depression or a contrary motion of the lever. The weight of the implement tends to raise the free end of the steering lever, and for the purpose of limiting this a guide bar 18 is secured to the frame. Thus the nose is maintained at a desired altitude, which may be increased temporarily to lift the nose over obstructions as the implement moves along the ground. Extra holes 19 are provided in the frame so that the guide bar 18 may be placed at various heights, thereby varying the normal altitude of the nose. At its rear end the implement is provided with a lattice floor 20, and a seat 21 is provided for the driver.

I avoid driving the horse over the fallen corn, by hitching the horse behind, so that he pushes the implement. For this purpose I provide a pair of shafts 25, which are attached to the implement by a vertical pivot 26, and made self sustaining by braces 27. The ends of the shafts are connected by a cross bar 28, which is removable to allow the horse to enter between the shafts. This cross bar carries a single-tree 29, to which the traces 30 are hitched. The horse's head is thus brought near the driver, who can readily control the horse by means of a short bridle rein 31.

Obviously, other modifications may be made in construction and arrangement of my apparatus without departure from the spirit of my invention.

While I have only shown a horse as a means for pushing the implement, it is so obvious that a tractor could be hitched to it just as the shafts are, that it is deemed unnecessary to illustrate this modification.

What I claim is as follows:

1. An implement for removing fallen stalks of growing corn from the space between the rows, comprising a shuttle-shaped body mounted on wheels, enabling it to move on the ground along said space, adapted by its shape to run its nose under the fallen stalks and remove them from its path as it passes; and means for raising the nose with reference to the wheels during transition, so the nose will pass over stones or other obstructions.

2. An implement for removing fallen stalks of growing corn from the space between the rows, comprising a shuttle-shaped body mounted on wheels, enabling it to move on the ground along said space, adapted by its shape to run its nose under the fallen stalks and remove them from its path as it passes; means for raising the nose with reference to the wheels, means for changing the relative positions of the wheels for the purpose of steering the implement, and a single manually operated element whereby to control said two means.

3. An implement for removing fallen stalks of growing corn from the space between adjacent rows, comprising a shuttle-shaped body adapted by its shape to run its nose under the fallen stalks and remove them from its path as it moves along said space; wheels under the rear of said body, and a wheel under the nose, said latter wheel being capable of up and down movement relative to said shuttle-shaped body, whereby to vary the altitude of the nose, and movable on a vertical axis for the purpose of guiding the implement, and manual means for imparting said movements.

4. An implement for removing fallen stalks of growing corn from the space between adjacent rows, comprising a shuttle-shaped body adapted by its shape to run its nose under the fallen stalks and remove them from its path as it moves along said space; wheels under the rear of said body, and a wheel under the nose, said latter wheel being mounted in a steering lever, which lever is pivotally connected to a horizontal rock bar, thereby enabling the lever to be swung laterally to steer the implement, and swung downward or upward for the purpose of raising or lowering the nose of the implement, and a guide whereby the upward movement of the lever is limited, thereby maintaining the nose at a given altitude while leaving the lever free to move laterally and downward.

5. An implement for removing fallen stalks of growing corn from the space between adjacent rows, comprising a shuttle-shaped body adapted by its shape to run its nose under the fallen stalks and remove them from its path as it moves along said space; wheels upon which said implement runs, means for raising and lowering the front wheel, thereby varying the height of the nose, means for turning the wheel on a vertical axis to steer the implement, and a single manually operable lever whereby the nose may be raised and lowered, or the implement steered, or both functions performed simultaneously.

6. An implement for removing fallen stalks of growing corn from the space between adjacent rows, comprising a shuttle-shaped body adapted by its shape to run its nose under the fallen stalks and remove them from its path as it moves along said space, said implement having a space for the occupancy of the operator; wheels upon which said implement runs, shafts pivotally attached to the rear end of the implement, wherein to hitch a horse for the purpose of pushing the implement along the space, and steering means whereby the operator can steer the implement and thus lead the horse while the horse pushes the implement.

7. An implement for removing fallen stalks of growing corn from the space between the rows, comprising a shuttle-like body mounted upon wheels, shafts pivotally attached to the rear of the body, wherein to hitch a horse to push the body along the ground, and steering mechanism carried by said body, whereby to steer the implement independently of the shafts.

8. An implement for removing fallen stalks of growing corn from the space between the rows, comprising a shuttle-shaped body, the nose of which body is mounted on a wheel, and means for varying the altitude of said nose with reference to said wheel as the implement moves along the ground.

LOREN L. SIZELOVE.